United States Patent
Suh et al.

(10) Patent No.: US 9,859,586 B2
(45) Date of Patent: Jan. 2, 2018

(54) FLEXIBLE SECONDARY BATTERY HAVING A FLEXIBLE MEMBER

(71) Applicant: SAMSUNG SDI CO., LTD., Yongin-si, Gyeonggi-do (KR)

(72) Inventors: Jun-Won Suh, Yongin-si (KR); Jeong-Doo Yi, Yongin-si (KR); Ju-Hee Sohn, Yongin-si (KR); Hyun-Hwa Song, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 200 days.

(21) Appl. No.: 14/315,281

(22) Filed: Jun. 25, 2014

(65) Prior Publication Data
US 2015/0155589 A1 Jun. 4, 2015

(30) Foreign Application Priority Data
Dec. 3, 2013 (KR) .................. 10-2013-0149470

(51) Int. Cl.
*H01M 6/00* (2006.01)
*H01M 10/04* (2006.01)
(Continued)

(52) U.S. Cl.
CPC ... *H01M 10/0436* (2013.01); *H01M 10/0463* (2013.01); *H01M 10/0468* (2013.01);
(Continued)

(58) Field of Classification Search
CPC ......... H01M 10/0436; H01M 10/0463; H01M 10/0468; H01M 2/168; H01M 10/0525; H01M 10/0585; H01M 2220/30
See application file for complete search history.

(56) References Cited

U.S. PATENT DOCUMENTS 6,383,234 B1 * 5/2002 Noh .................. H01M 10/0413
29/623.1
2003/0039883 A1 2/2003 Notten et al.
(Continued)

FOREIGN PATENT DOCUMENTS

DE 10 2011 015 152 A1 9/2012
EP 2 477 267 A1 7/2012
(Continued)

OTHER PUBLICATIONS

EPO Search Report dated Feb. 23, 2015, for corresponding European Patent application 14195486.7, (6 pages).

*Primary Examiner* — Raymond Alejandro
(74) *Attorney, Agent, or Firm* — Lewis Roca Rothgerber Christie LLP (57) ABSTRACT

A flexible secondary battery includes an electrode stack assembly including a first electrode layer, a second electrode layer, and a separator between the first and second electrode layers; wherein the electrode stack assembly has a first end portion and a second end portion located opposite to the first end portion; and a fixing member fixing the first electrode layer, the separator, and the second electrode layer together; wherein the electrode stack assembly includes a fixing member region in which the fixing member is formed, the fixing member region being located between the first and second end portions of the electrode stack assembly in a first direction, and wherein the first electrode layer, the separator, and the second electrode layer are flexible at both sides of the fixing member.

20 Claims, 6 Drawing Sheets

(51) Int. Cl.
   *H01M 10/0525* (2010.01)
   *H01M 10/0585* (2010.01)
   *H01M 2/16* (2006.01)

(52) U.S. Cl.
   CPC ........ *H01M 2/168* (2013.01); *H01M 10/0525* (2013.01); *H01M 10/0585* (2013.01); *H01M 2220/30* (2013.01)

(56) References Cited

U.S. PATENT DOCUMENTS

| | | | |
|---|---|---|---|
| 2007/0111089 A1* | 5/2007 | Swan | H01M 2/024 429/160 |
| 2008/0032170 A1 | 2/2008 | Wainright et al. | |
| 2010/0330405 A1 | 12/2010 | Sumihara et al. | |
| 2011/0151323 A1 | 6/2011 | Song et al. | |
| 2013/0295431 A1 | 11/2013 | Kwon et al. | |
| 2014/0079979 A1 | 3/2014 | Kwon et al. | |
| 2014/0113171 A1 | 4/2014 | Schaefer | |

FOREIGN PATENT DOCUMENTS

| | | |
|---|---|---|
| JP | 2010-62136 A | 3/2010 |
| KR | 10-2011-0070029 A | 6/2011 |
| KR | 10-1217562 B1 | 1/2013 |
| KR | 10-2014-0035689 A | 3/2014 |

\* cited by examiner

FLEXIBLE SECONDARY BATTERY HAVING A FLEXIBLE MEMBER

CROSS-REFERENCE TO RELATED APPLICATION

This application claims priority to and the benefit of Korean Patent Application No. 10-2013-0149470, filed on Dec. 3, 2013, in the Korean Intellectual Property Office, the disclosure of which is incorporated herein in its entirety by reference.

BACKGROUND

1. Field

One or more embodiments of the present invention relate to a flexible secondary battery.

2. Description of the Related Art

With the development of electronics, markets for cellular phones, portable multimedia players (PMPs), and mpeg audio layer-3 (MP3) players, and markets for other various portable electronic devices such as smartphones, smart pads, electronic book readers, flexible tablet computers, and portable medical devices attachable to the human body have markedly grown.

The growth of markets for such portable electronic devices has increased demand for batteries suitable for operating such portable electronic devices. In addition, such portable electronic devices are increasingly required to be flexible in view of durability during transportation, storage, and impact, and thus the demand for flexible batteries has also increased.

SUMMARY

One or more embodiments of the present invention include a flexible secondary battery which is stable even when repeatedly flexed or bent.

Additional aspects will be set forth in part in the description which follows and, in part, will be apparent from the description, or may be learned by practice of the presented embodiments.

According to one or more embodiments of the present invention, a flexible secondary battery includes: an electrode stack assembly including a first electrode layer, a second electrode layer, and a separator between the first and second electrode layers; and a fixing member configured to fix the first electrode layer, the separator, and the second electrode layer, wherein the electrode stack assembly includes a fixing member region in which the fixing member is formed, the fixing member region is located between an end portion and the other end portion of the electrode stack assembly in a first direction, and the first electrode layer, the separator, and the second electrode layer are flexible at both sides of the fixing member.

The first electrode layer may include a first active material coating portion coated with a first active material and a first non-coating portion not coated with the first active material, the second electrode layer may include a second active material coating portion coated with a second active material and a second non-coating portion not coated with the second active material, and the first non-coating portion and the second non-coating portion may be located in the fixing member region.

The fixing member region may be located at a center position between the end portion and the other end portion.

Relative displacements of the first electrode layer, the separator, and the second electrode layer may be equal at the end portion and the other end portion.

The electrode stack assembly may further include a first connection tab electrically connected to the first non-coating portion and a second connection tab electrically connected to the second non-coating portion, and the first and second connection tabs may extend in opposite second directions that are perpendicular to the first direction.

The flexible secondary battery may further include a pouch sealing the electrode stack assembly, wherein a first electrode terminal connected to the first connection tab and a second electrode terminal connected to the second connection tab may be exposed to an outside of the pouch after penetrating the pouch.

The fixing member may be an adhesive or a tape coated with an adhesive, and the adhesive or the tape may be located between the first non-coating portion and the separator and between the separator and the second non-coating portion.

Holes may be formed in the first non-coating portion, the separator, and the second non-coating portion, respectively, and the fixing member may be a rivet inserted in the holes.

The flexible secondary battery may further include a protection layer formed on an outer surface of the electrode stack assembly.

The protection layer may have a greater bending stiffness than an average bending stiffness of the first electrode layer, the separator, and the second electrode layer.

The fixing member region may include a first region and a second region that are separate from each other in the first direction, and the fixing member may include a first fixing member formed in the first region and a second fixing member formed in the second region.

According to one or more embodiments of the present invention, a flexible secondary battery includes: a pouch; an electrode stack assembly accommodated in the pouch; and at least one fixing member formed in the electrode stack assembly, wherein the electrode stack assembly includes a first electrode layer including a first non-coating portion, a second electrode layer including a second non-coating portion, and a separator located between the first and second electrode layers, and wherein the fixing member is located between an end portion and the other end portion of the electrode stack assembly in a first direction and fixes the first non-coating portion, the separator, and the second non-coating portion to each other.

The fixing member may be located in a center region between the end portion and the other end portion.

Relative displacements of the first electrode layer, the separator, and the second electrode layer may be equal at the end portion and the other end portion.

The fixing member may include a first fixing member and a second fixing member that are separate from each other.

The electrode assembly may further include a first connection tab electrically connected to the first non-coating portion and a second connection tab electrically connected to the second non-coating portion, and the first and second connection tabs may extend in opposite second directions that are perpendicular to the first direction.

A first electrode terminal connected to the first connection tab and a second electrode terminal connected to the second connection tab may be exposed to an outside of the pouch after penetrating the pouch.

The fixing member may be an adhesive or a tape coated with an adhesive, and the adhesive or the tape may be located between the first non-coating portion and the separator and between the separator and the second non-coating portion.

Holes may be formed in the first non-coating portion, the separator, and the second non-coating portion, respectively, and the fixing member may be a rivet inserted in the holes.

The flexible secondary battery may further include a protection layer formed on an outer surface of the electrode stack assembly, wherein the protection layer may have a greater bending stiffness than an average bending stiffness of the first electrode layer, the separator, and the second electrode layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings. Effects and features of the embodiments, and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, the embodiments of the present invention will be described in detail with reference to the accompanying drawings. In the drawings, like reference numerals denote like elements, and overlapping descriptions thereof will be omitted.

In the following descriptions of the embodiments, although the terms "first and second" are used to describe various elements, these elements should not be limited by these terms. These terms are only used to distinguish one element from another element.

In the following descriptions of the embodiments, the terms of a singular form may include plural forms unless referred to the contrary.

In the following descriptions of the embodiments, the meaning of "include," "comprise," "including," or "comprising," specifies a property, a region, a fixed number, a step, a process, an element and/or a component but does not exclude other properties, regions, fixed numbers, steps, processes, elements.

It will be understood that when something such as an element is referred to as being "above" or "on" another element, it can be directly on the other element, or intervening elements may also be present.

In the drawings, the sizes of elements may be exaggerated for clarity. For example, in the drawings, the size or thickness of each element may be arbitrarily shown for illustrative purpose, and thus the present invention should not be construed as being limited thereto.

Figure 1:
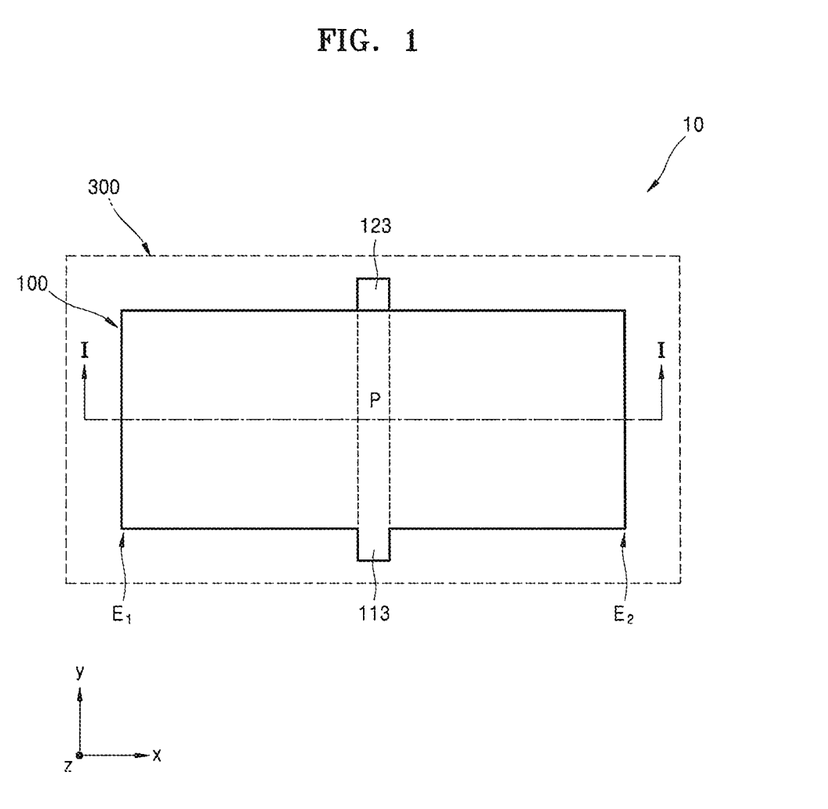
FIG. 1 is a schematic plan view illustrating a flexible secondary battery according to an embodiment of the present invention.

FIG. 1 is a schematic plan view illustrating a flexible secondary battery 10 according to an embodiment of the present invention, FIG. 2(A) is a schematic cross-sectional view taken along line I-I of FIG. 1, and FIGS. 2(B) and 2(C) are cross-section views of FIG. 2(A), wherein an electrode stack assembly is bent.

Figure 2:
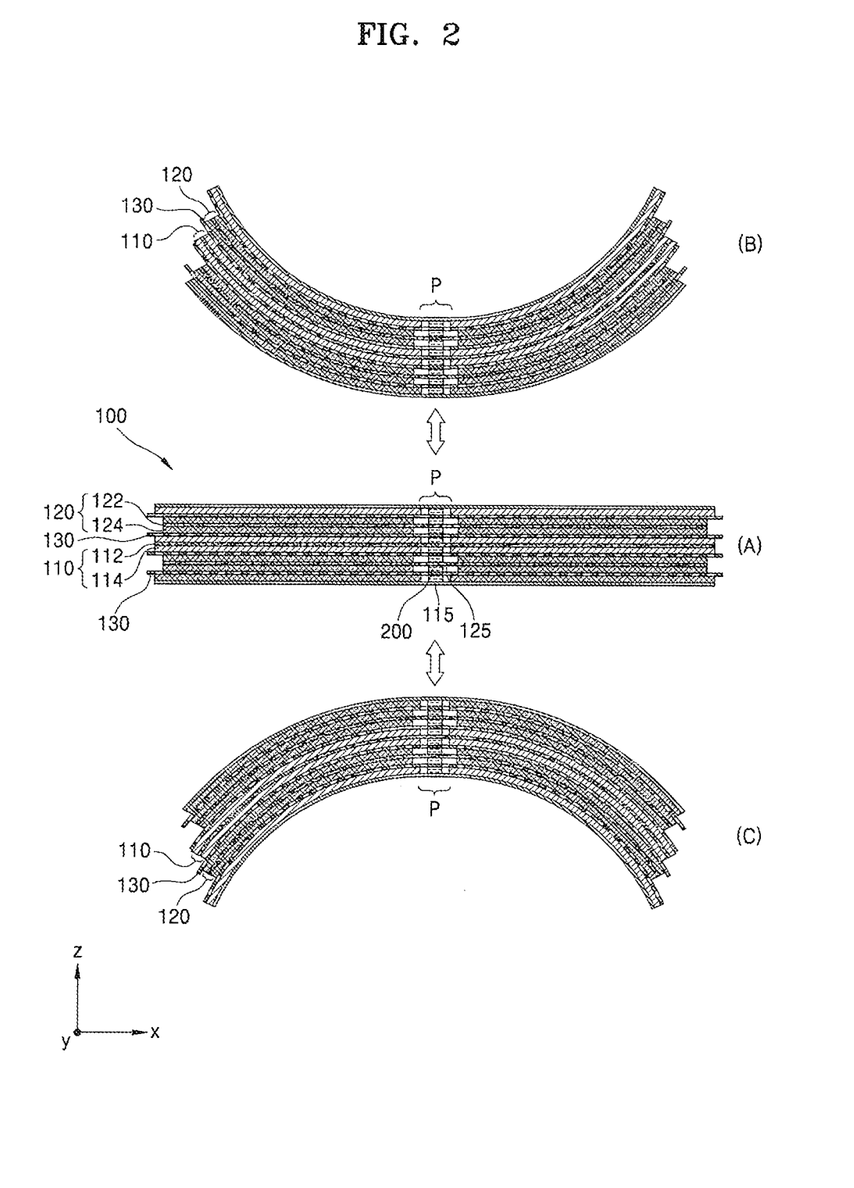
FIG. 2(A) is a cross-sectional view taken along line I-I of FIG. 1.
FIGS. 2(B) and 2(C) are cross-section views of FIG. 2(A), wherein an electrode stack assembly is bent.

Referring to FIGS. 1 to 2(C), the flexible secondary battery 10 of the embodiment of the present invention may include an electrode stack assembly 100, a fixing member 200 formed in the electrode stack assembly 100, and a pouch 300 accommodating and sealing the electrode stack assembly 100.

The electrode stack assembly 100 may include a first electrode layer 110, a second electrode layer 120, and a separator 130 located between the first electrode layer 110 and the second electrode layer 120. In the current embodiment, the electrode stack assembly 100 of the flexible secondary battery 10 may include a stack structure in which a plurality of first electrode layers 110, a plurality of second electrode layers 120, and a plurality of separators 130 are stacked.

The first electrode layer 110 may be one of a positive electrode film and a negative electrode film. If the first electrode layer 110 is a positive electrode film, the second electrode layer 120 may be a negative electrode film. On the other hand, if the first electrode layer 110 is a negative electrode film, the second electrode layer 120 may be a positive electrode film.

The first electrode layer 110 may include a first metal collector 112, a first active material coating portion 114 formed by coating the first metal collector 112 with a first active material, and a first non-coating portion 115 which is a portion of the first metal collector 112 not coated with the first active material. Similarly, the second electrode layer 120 may include a second metal collector 122, a second active material coating portion 124 formed by coating the second metal collector 122 with a second active material, and a second non-coating portion 125 which is a portion of the second metal collector 122 not coated with the second active material.

If the first electrode layer 110 is a positive electrode film, the first metal collector 112 may be a positive electrode collector, and the first active material coating portion 114 may be a positive electrode active material coating portion. If the second electrode layer 120 is a negative electrode film, the second metal collector 122 may be a negative electrode collector, and the second active material coating portion 124 may be a negative electrode active material coating portion.

The positive electrode collector may include aluminum, stainless steel, titanium, silver, or a combination thereof. The positive electrode active material coating portion may include a positive electrode active material, a binder, and a conducting agent.

The positive electrode active material may allow reversible intercalation and discharge of lithium ions. For example, the positive electrode active material includes at least one material selected from the group consisting of lithium transition metal oxides such as lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate; nickel sulfides; copper sulfides; sulfur; iron oxides; and vanadium oxides.

The binder may include at least one material selected from the group consisting of polyvinylidene fluoride-containing binders such as polyvinylidene fluoride, vinylidene fluoride/hexafluoropropylene copolymer, vinylidene fluoride/tetrafluoroethylene copolymer; carboxymethyl cellulose-containing binders such as sodium-carboxymethyl cellulose and lithium-carboxymethyl cellulose; acrylate-containing binders such as polyacrylic acid, lithium-polyacrylic acid, acrylic, polyacrylonitrile, polymethyl methacrylate, and polybutylacrylate; polyamide-imides; polytetrafluoroethylene; polyethylene oxide; polypyrrole; lithium-Nafion; and styrene butadiene rubber-containing polymers.

The conducting agent may include at least one material selected from the group consisting of carbon-containing conducting agents such as carbon black, carbon fiber, and graphite; conductive fiber such as metal fiber; metal powder such as carbon fluoride powder, aluminum powder, and nickel powder; conductive whisker such as zinc oxides and potassium titanate; conductive metal oxides such as titanium oxides; and conductive polymers such as polyphenylene derivatives.

The negative electrode collector may include at least one metal selected from the group consisting of copper, stainless steel, nickel, aluminum, and titanium. The negative electrode active material coating portion may include a negative electrode active material, a binder, and a conducting agent.

The negative electrode active material may a material capable of forming an alloy together with lithium or may allow reversible intercalation and discharge of lithium. For example, the negative electrode active material may include at least one material selected from the group consisting of metals, carbon-containing materials, metal oxides, and lithium metal oxides.

The metals may include at least one selected from the group consisting of lithium, silicon, magnesium, calcium, aluminum, germanium, tin, lead, arsenic, antimony, bismuth, silver, gold, zinc, cadmium, mercury, copper, iron, nickel, cobalt, and indium.

The carbon-containing materials may include at least one material selected from the group consisting of graphite, graphite carbon fiber, coke, mesocarbon microbeads (MCMBs), polyacene, pitch-derived carbon fiber, and hard carbon.

The metal oxides may include at least one selected from the group consisting of lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

The binder and the conducting agent may be the same as the binder and the conducting agent included in the positive electrode active material.

The positive electrode film and the negative electrode film may be formed by applying active materials to metal collectors by various methods. That is, methods of applying electrode active materials are not limited.

The separator 130 may be a porous polymer film such as a polyethylene film or a polypropylene film. The separator 130 may be woven fabric or non-woven fabric including polymer fabric. The separators 130 may include ceramic particles and may be formed of solid polymer electrolyte. The separator 130 may be an independent film or may be a porous layer formed on the first electrode layer 110 or the second electrode layer 120.

The separator 130 electrically separates the first electrode layer 110 and the second electrode layer 120 from each other, and is not required to have the same shape as the shape of the first electrode layer 110 or the second electrode layer 120.

The electrode stack assembly 100 may include a fixing member region P. The fixing member 200 may be formed in the fixing member region P, and the fixing member region P may be located between a first end portion $E_1$ and a second end portion $E_2$ of the electrode stack assembly 100 in a first direction, for example, in the length direction (x-axis direction) of the electrode stack assembly 100.

The fixing member 200 may fix together the first electrode layer 110, the separator 130, and the second electrode layer 120. In detail, the fixing member 200 may fix the first non-coating portion 115, the separator 130, and the second non-coating portion 125 to each other in a region between the end portion $E_1$ and the other end portion $E_2$ of the electrode stack assembly 100.

For example, the fixing member 200 may be an adhesive or adhesive-coated tape located between the first non-coating portion 115 and the separator 130 and between the separator 130 and the second non-coating portion 125. The fixing member 200 may extend in a second direction perpendicular to the first direction. For example, the fixing member 200 may extend in the width direction (y-axis direction) of the electrode stack assembly 100.

As shown in FIGS. 2(A)-(C), after the fixing member 200 is formed in the fixing member region P, the first electrode layer 110, the separator 130, and the second electrode layer 120 may be repeatedly bent through slippage at both sides of the fixing member 200 (FIGS. 2(B) and 2(C)) while the positions of the first electrode layer 110, the separator 130, and the second electrode layer 120 relative to each other are maintained.

If the fixing member 200 is not provided, when the electrode stack assembly 100 is repeatedly bent, the relative positions of the first electrode layer 110, the separator 130, and the second electrode layer 120 may be changed, and the arrangement thereof may be in disorder. In this case, a reversible electrochemical reaction may be decreased, and a short circuit may be formed between the first electrode layer 110 and the second electrode layer 120. In other words, although the first electrode layer 110, the separator 130, and the second electrode layer 120 may be repeatedly bent, an arrangement thereof for a reversible electrochemical reaction may be maintained due to the fixing member 200.

In addition, since the fixing member 200 is located between the end portions $E_1$ and $E_2$ of the electrode stack assembly 100, relative displacements of the first electrode layer 110, the separator 130, and the second electrode layer 120 may be small at the end portions $E_1$ and $E_2$ of the electrode stack assembly 100, and thus parts such as the electrode stack assembly 100 may be under less stress.

If the fixing member 200 is formed in only one end portion $E_1$ or the other end portion $E_2$ of the electrode stack assembly 100, when the electrode stack assembly 100 is bent to the same curvature, relative displacements of the first electrode layer 110, the separator 130, and the second electrode layer 120 may be respectively great at the other end portion $E_2$ or $E_1$. As a result, when the electrode stack assembly 100 is bent, the electrode stack assembly 100 may be stressed much more, and if the electrode stack assembly 100 is repeatedly bent, the electrode stack assembly 100 and the pouch 300 may be deformed or damaged because of accumulation of increased stress.

Therefore, since the fixing member 200 is located between the end portions $E_1$ and $E_2$ of the electrode stack assembly 100, when the electrode stack assembly 100 is bent, relative displacements of the first electrode layer 110, the separator 130, and the second electrode layer 120 may be reduced, and the electrode stack assembly 100 and the pouch 300 may be under less stress. Thus, the flexible secondary battery 10 may be stably maintained against repetitive bending or flexure.

For example, the fixing member region P may be located at a center position between the end portion $E_1$ and the other end portion $E_2$. In this case, relative displacements of the first electrode layer 110, the separator 130, and the second electrode layer 120 at the end portions $E_1$ and $E_2$ may be half the relative displacements of the first electrode layer 110, the separator 130, and the second electrode layer 120 at the end portion $E_1$ or $E_2$ when the fixing member 200 is only formed at the opposite end portion, namely $E_2$ or $E_1$.

In addition, when the fixing member region P is located at a center position between the end portions $E_1$ and $E_2$, relative displacements of the first electrode layer 110, the separator 130, and the second electrode layer 120 may be equal at the end portions $E_1$ and $E_2$, and thus stress caused by bending may be uniformly distributed throughout the electrode stack assembly 100.

The electrode stack assembly 100 may include: a first connection tab 113 electrically connected to the first non-coating portion 115; and a second connection tab 123 electrically connected to the second non-coating portion 125. The first connection tab 113 may be formed by extending the first metal collector 112, and the second connection tab 123 may be formed by extending the second metal collector 122.

In the current embodiment, the flexible secondary battery 10 may include a plurality of first electrode layers 110 and a plurality of second electrode layers 120. In this case, first connection tabs 113 respectively included in the first electrode layers 110 are connected to a first electrode terminal, and second connection tabs 123 respectively included in the second electrode layers 120 are connected to a second electrode terminal.

In other words, since the first connection tabs 113 are connected and fixed to each other and the second connection tabs 123 are connected and fixed to each other, the first connection tabs 113 may have a function of fixing the first electrode layers 110, and the second connection tabs 123 may have a function of fixing the second electrode layers 120.

If the first connection tabs 113 are connected and fixed to each other at a position not aligned with the position of the end portion $E_1$, the other end portion $E_2$, or the fixing member region P, when the electrode stack assembly 100 is bent, the first electrode layers 110 may be internally bent between the fixing member 200 and the first connection tabs 113 connected and fixed to each other, or the first electrode layers 110 and the separator 130 may be subjected to stripping, separation, or deterioration upon contact. Moreover, the fixing member 200 may partially break, and the arrangement of the first electrode layers 110, the separator 130, and the second electrode layers 120 may not be maintained.

For these reasons, the first connection tabs 113 may be located in the fixing member region P. For the same reasons, the second connection tabs 123 may be located in the fixing member region P. To this end, first non-coating portions 115 and second non-coating portions 125 may be located in the fixing member region P. In other words, the first electrode layers 110 may include first active material coating portions 114 at both sides of the first non-coating portions 115, and the second electrode layers 120 may include second active material coating portions 124 at both sides of the second non-coating portions 125.

The first connection tabs 113 and the second connection tabs 123 may extend in second directions that are perpendicular to the first direction, for example, in opposite width directions (y-axis directions) of the electrode stack assembly 100. Therefore, a short circuit between the first connection tabs 113 and the second connection tabs 123 may be effectively prevented.

The first connection tabs 113 may be connected to the first electrode terminal, and the second connection tabs 123 may be connected to the second electrode terminal. The first electrode terminal and the second electrode terminal may penetrate the pouch 300 and may be exposed to the outside of the pouch 300. The flexible secondary battery 10 may be charged and discharged through the first and second electrode terminals.

The pouch 300 may accommodate the electrode stack assembly 100 together with electrolyte and may seal the electrode stack assembly 100 and the electrolyte. The pouch 300 may be flexible and prevent permeation of moisture or oxygen into the flexible secondary battery 10. For example, the pouch 300 may have a triple-layer structure formed by an insulation layer, a metal layer, and an insulation layer. The metal layer may be formed of a material such as aluminum, steel, or stainless steel, and the insulation layers may be formed of a material such as chlorinated polypropylene (CPP), polyethylene terephthalate (PET), or nylon. However, the metal layer and the insulation layers are not limited thereto.

Figure 3:
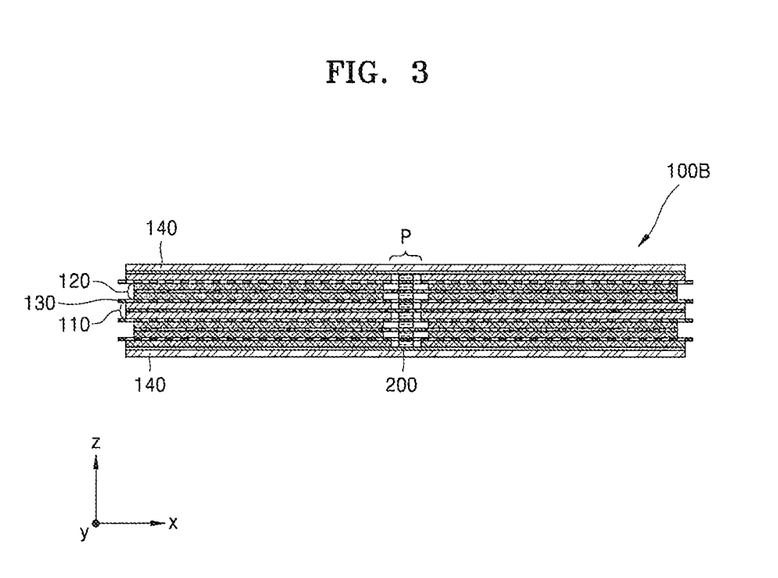
FIG. 3 is a cross-sectional view illustrating a modified example of an electrode stack assembly depicted in FIG. 1.

FIG. 3 is a schematic cross-sectional view illustrating a modification example of the electrode stack assembly depicted in FIG. 1.

Referring to FIG. 3, an electrode stack assembly 100B may include a first electrode layer 110, a second electrode layer 120, and a separator 130 located between the first electrode layer 110 and the second electrode layer 120. In detail, a fixing member 200 may be formed in a fixing member region P of the electrode stack assembly 100B to fix a first non-coating portion 115, the separator 130, and a second non-coating portion 125.

The first electrode layer 110, the second electrode layer 120, the separator 130, and the fixing member 200 are the same as those described with reference to FIGS. 1 and 2, and thus descriptions thereof will not be repeated.

A protection layer 140 may be further formed on the electrode stack assembly 100B. When the electrode stack assembly 100B is flexed, the protection layer 140 may prevent the first electrode layer 110, the separator 130, or the second electrode layer 120 from wrinkling.

In other words, if the electrode stack assembly 100B is flexed, the first electrode layer 110, the separator 130, and the second electrode layer 120 may tend to wrinkle to relieve compressive stress. In this case, the protection layer 140 may prevent the first electrode layer 110, the separator 130, or the second electrode layer 120 from being largely deformed by suppressing initial slight deformation such as wrinkles having small radii of curvature, and may relieve stress of the first electrode layer 110, the separator 130, and the second electrode layer 120.

To prevent deformation such as wrinkles of the first electrode layer 110, the separator 130, or the second electrode layer 120, the protection layer 140 may have a greater bending stiffness than an average bending stiffness of the first electrode layer 110, the separator 130, and the second electrode layer 120. For example, the bending stiffness of the protection layer 140 may be equal to or greater than about 1.5 times the average bending stiffness of the first electrode layer 110, the separator 130, and the second electrode layer 120.

In this manner, the protection layer 140 may be formed of a material having a constant degree of stiffness and a certain degree of flexibility so as not to largely affect bending of the electrode stack assembly 100B. For example, the protection layer 140 may be formed of a polymer film, a film including a laminated polymer film layer, metal foil, or a composite material film including carbon. However, the protection layer 140 is not limited thereto. In addition, the protection layer 140 may have a thickness of about 15 micrometers to about 1 millimeter and a tensile modulus of elasticity of about 0.5 GPa to about 300 GPa.

Figure 4:
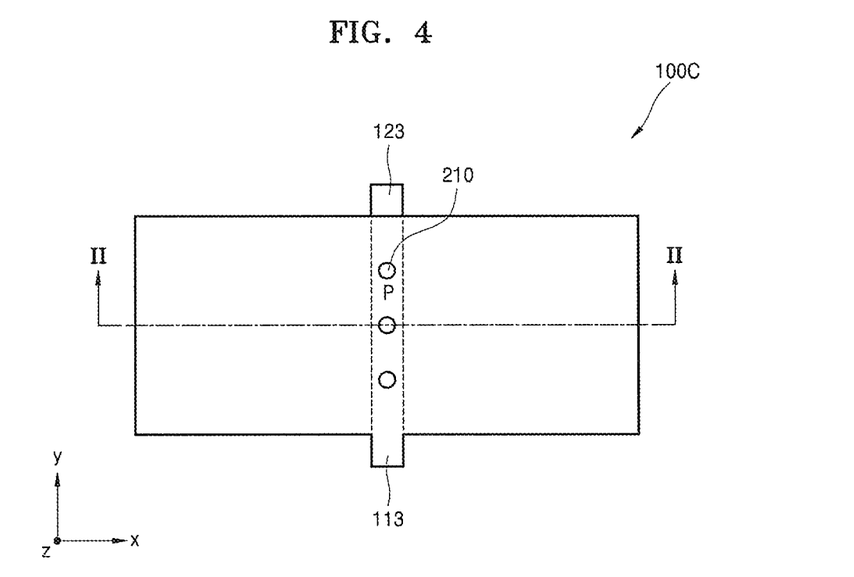
FIG. 4 is a schematic plan view illustrating another modified example of the electrode stack assembly depicted in FIG. 1.
Figure 5:
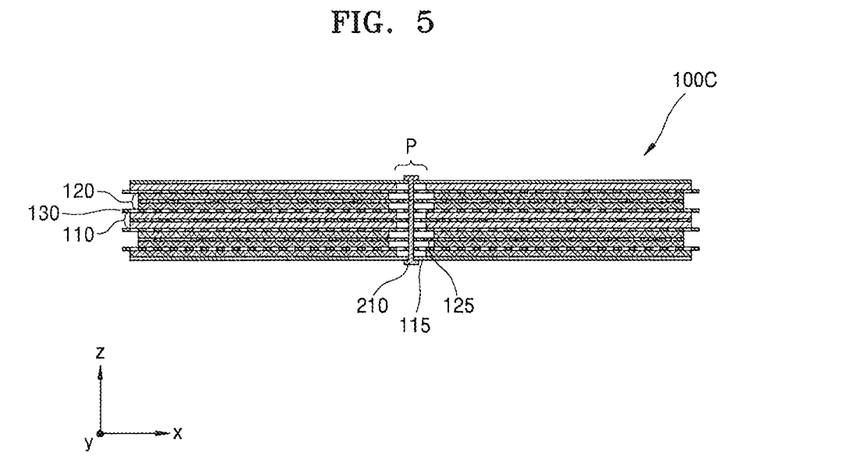
FIG. 5 is a cross-sectional view taken along line II-II of FIG. 4.

FIG. 4 is a schematic cross-sectional view illustrating another modification example of the electrode stack assembly 100 depicted in FIG. 1, and FIG. 5 is a schematic cross-sectional view taken line II-II of FIG. 4.

Referring to FIGS. 4 and 5, an electrode stack assembly 100C may include a first electrode layer 110, a second electrode layer 120, and a separator 130 located between the first electrode layer 110 and the second electrode layer 120. In addition, the electrode stack assembly 100C may include: a first connection tab 113 electrically connected to the first electrode layer 110; and a second connection tab 123 electrically connected to the second electrode layer 120.

The first electrode layer 110, the second electrode layer 120, and the separator 130 are the same as those described with reference to FIGS. 1 and 2, and thus descriptions thereof will not be repeated.

A fixing member 210 may be formed in a fixing member region P of the electrode stack assembly 100C to fix a first non-coating portion 115, the separator 130, and a second non-coating portion 125.

For example, the fixing member 210 may be a rivet inserted in holes formed in the first non-coating portion 115, the separator 130, and the second non-coating portion 125. The rivet may be formed of an insulation material. The rivet may be formed by aligning and stacking the first non-coating portion 115, the separator 130, and the second non-coating portion 125 in which holes are previously formed, and riveting the first non-coating portion 115, the separator 130, and the second non-coating portion 125 with a polymer pin. A plurality of rivets may be formed in a second direction, for example, in the width direction (y-axis direction) of the electrode stack assembly 100C.

As described above, if the first non-coating portion 115, the separator 130, and the second non-coating portion 125 are fixed to each other by using a rivet, the electrode stack assembly 100C may be formed through a simple process.

Figure 6:
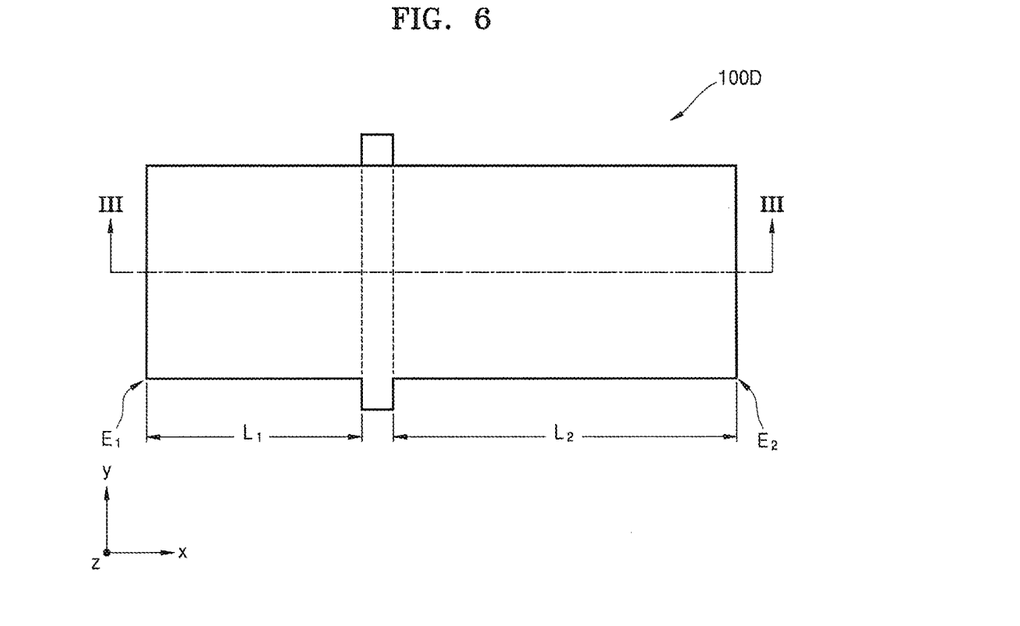
FIG. 6 is a schematic plan view illustrating another modified example of the electrode stack assembly depicted in FIG. 1.
Figure 7:
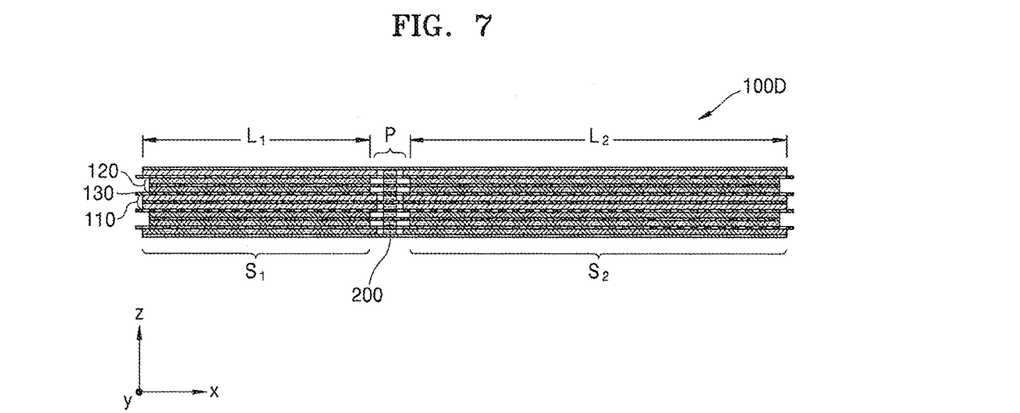
FIG. 7 is a cross-sectional view taken along line III-III of FIG. 6.

FIG. 6 is a schematic cross-sectional view illustrating another modification example of the electrode stack assembly 100 depicted in FIG. 1, and FIG. 7 is a schematic cross-sectional view taken line III-III of FIG. 6.

Referring to FIGS. 6 and 7, an electrode stack assembly 100D may include a first electrode layer 110, a second electrode layer 120, and a separator 130 located between the first electrode layer 110 and the second electrode layer 120. In addition, the electrode stack assembly 100D may include a fixing member region P in which a fixing member 200 is formed.

The first electrode layer 110, the second electrode layer 120, the separator 130, and the fixing member 200 are the same as those described with reference to FIGS. 1 and 2, and thus descriptions thereof will not be repeated.

Referring to FIGS. 6 and 7, the fixing member region P may be located between end portions $E_1$ and $E_2$ of the electrode stack assembly 100D at a position closer to one of the end portions $E_1$ and $E_2$ than to the other.

The electrode stack assembly 100D may be bent at both sides of the fixing member 200. For example, the electrode stack assembly 100D may be flexed to different curvatures at both sides of the fixing member 200. In this case, since a side of the electrode stack assembly 100D bent to a relatively large curvature is subjected to relatively large stress, if the fixing member 200 is moved from the center of the electrode stack assembly 100D to a side having a relatively small curvature, stress distribution in the electrode stack assembly 100D may be uniformly adjusted.

For example, if the electrode stack assembly 100D is flexed to a relatively large curvature at a side $S_2$ of the fixing member 200 (the side $S_2$ will be referred to as an electrode stack part $S_2$), the fixing member 200 may be formed at a position relatively close to the end portion $E_1$ of the electrode stack assembly 100D, and then the length of the electrode stack part $S_2$ may be increased to a second length $L_2$. Therefore, the electrode stack part $S_2$ may be under less stress because the amount of bending per unit length is reduced.

On the other hand, since the length of an electrode stack part $S_1$ located at the other side of the fixing member 200 is decreased to a first length $L_1$, stress in the electrode stack part $S_1$ may be increased, which may be considered as a result of transfer of stress reduced in the electrode stack part $S_2$ to the electrode stack part $S_1$. In other words, if the electrode stack assembly 100D is flexed to different curvatures at both sides of the fixing member 200, the position of the fixing member 200 may be adjusted to uniformly distribute stress in the electrode stack assembly 100D.

Figure 8:
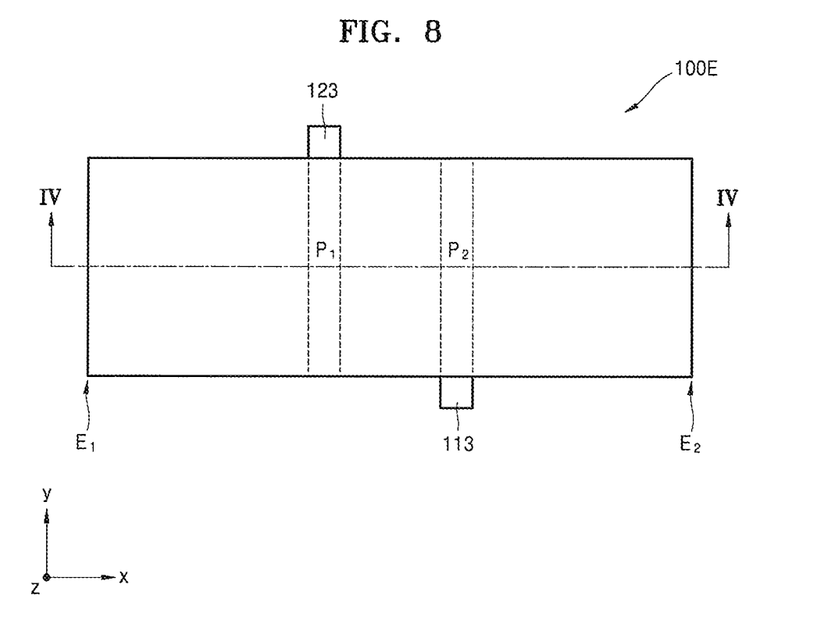
FIG. 8 is a schematic plan view illustrating another modified example of the electrode stack assembly depicted in FIG. 1.
Figure 9:
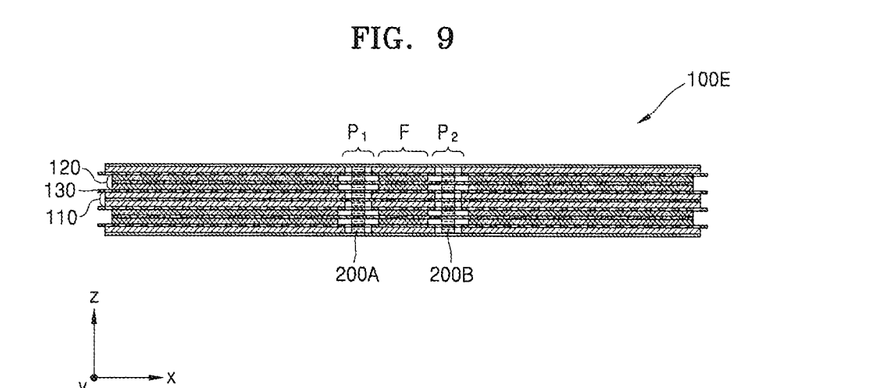
FIG. 9 is a cross-sectional view taken along line IV-IV of FIG. 8.

FIG. 8 is a schematic cross-sectional view illustrating another modification example of the electrode stack assembly 100 depicted in FIG. 1, and FIG. 9 is a schematic cross-sectional view taken line IV-IV of FIG. 8.

Referring to FIGS. 8 and 9, an electrode stack assembly 100E may include a first electrode layer 110, a second electrode layer 120, and a separator 130 located between the first electrode layer 110 and the second electrode layer 120. In addition, the electrode stack assembly 100E may further include: a first connection tab 113 electrically connected to the first electrode layer 110; and a second connection tab 123 electrically connected to the second electrode layer 120.

The electrode stack assembly 100E may include a first region $P_1$ and a second region $P_2$. A first fixing member 200A and a second fixing member 200B may be formed in the first and second regions $P_1$ and $P_2$, respectively. The first and second regions $P_1$ and $P_2$ may be the same as the fixing member region P described with reference to FIGS. 1 and 2, and the first and second fixing members 200A and 200B may be the same as the fixing member 200 described with reference to FIGS. 1 and 2.

The first and second regions $P_1$ and $P_2$ may be separate from each other in a first direction, that is, in the length direction of the electrode stack assembly 100E, and a fixed region F, which is not subject to repetitive flexing or bending, may be formed between the first and second regions $P_1$ and $P_2$.

Since the first and second fixing members 200A and 200B are respectively formed in the first and second regions $P_1$ and $P_2$, the first electrode layer 110, the separator 130, and the second electrode layer 120 may be fixed to each other more effectively.

If the fixed region F is flexed when the electrode stack assembly 100E is bent, portions of the first electrode layer 110, the separator 130, and the second electrode layer 120 located in the fixed region F may be internally bent. Therefore, the fixed region F may be designed not to be bent when the electrode stack assembly 100E is bent, and if the electrode stack assembly 100E, including the fixed region F, is required to have a curved shape, the fixed region F may first be formed to have a predetermined curvature, and then the first and second fixing members 200A and 200B may be formed.

The first and second connection tabs 113 and 123 may extend in second directions that are perpendicular to the first direction, for example, in opposite width directions (y-axis directions) of the electrode stack assembly 100E. The first and second connection tabs 113 and 123 may be positioned in the first and second regions $P_1$ and $P_2$, respectively.

As described above, according to the one or more embodiments of the present invention, the flexible battery module may be stable even when being repeatedly flexed or bent.

The effects of the embodiments of the present invention may be understood from the above description with reference to the accompanying drawings.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A flexible secondary battery comprising:
an electrode stack assembly comprising a first electrode layer, a second electrode layer, and a separator between the first and second electrode layers; wherein the electrode stack assembly has a first end and a second end portion located opposite to the first end; and
a separate fixing member physically attached to the first electrode layer and the second electrode layer to fix them together, wherein the fixing member is located between and directly contacts the first and second electrode layers and further wherein the fixing member is located between the first and second ends of the electrode stack assembly; and
wherein the first electrode layer, the separator, and the second electrode layer on both sides of the fixing member are flexible and configured to be bent.

2. The flexible secondary battery of claim 1, wherein the first electrode layer comprises a first active material coating portion coated with a first active material and a first non-coating portion not coated with the first active material,
wherein the second electrode layer comprises a second active material coating portion coated with a second active material and a second non-coating portion not coated with the second active material, and
wherein the fixing member is located in the first non-coating portion and the second non-coating portion.

3. The flexible secondary battery of claim 2, wherein the fixing member is located equidistant from the first and second ends.

4. The flexible secondary battery of claim 3, wherein the electrode stack assembly is configured such that relative displacement of the first electrode layer, the separator, and the second electrode layer is equal at the first and, second ends when the secondary battery is bent.

5. The flexible secondary battery of claim 2, wherein the electrode stack assembly further comprises a first connection tab electrically connected to the first non-coating portion and a second connection tab electrically connected to the second non-coating portion, and
wherein the first and second connection tabs extend in opposite second directions that are perpendicular to the first direction.

6. The flexible secondary battery of claim 5, further comprising a pouch accommodating the electrode stack assembly,
wherein a first electrode terminal connected to the first connection tab and a second electrode terminal connected to the second connection tab are exposed to an outside of the pouch.

7. The flexible secondary battery of claim 2, wherein the fixing member adheres the first electrode layer and the second electrode layer together, wherein the fixing member is an adhesive or a tape coated with an adhesive, and the adhesive or the tape is located between the first non-coating portion and the separator and between the separator and the second non-coating portion.

8. The flexible secondary battery of claim 2, wherein holes are formed in the first non-coating portion, the separator, and the second non-coating portion, respectively, and
wherein the fixing member is a rivet accommodated in the holes.

9. The flexible secondary battery of claim 1, further comprising a protection layer formed on an outer surface of the electrode stack assembly.

10. The flexible secondary battery of claim 9, wherein the protection layer has a greater bending stiffness than an average bending stiffness of the first electrode layer, the separator, and the second electrode layer.

11. The flexible secondary battery of claim 1, wherein the fixing member region comprises a first region and a second region that are separate from each other in the first direction, and
wherein the fixing member comprises a first fixing member formed in the first region and a second fixing member formed in the second region.

12. A flexible secondary battery comprising:
a pouch;
an electrode stack assembly accommodated in the pouch, wherein the electrode stack assembly comprises a first electrode layer comprising a first non-coating portion, a second electrode layer comprising a second non-coating portion, and a separator located between the first and second electrode layers; and at least one separate fixing member physically attached to the electrode stack assembly, wherein the fixing member is located between a first end and a second end of the electrode stack assembly and wherein the fixing member fixes the separator to the first non-coating portion and to the second non-coating portion to each other by being located between them and by directly contacting them.

13. The flexible secondary battery of claim 12, wherein the fixing member is located equidistant between the first and second ends.

14. The flexible secondary battery of claim 13, wherein the electrode stack assembly is configured such that relative displacement of the first electrode layer, the separator, and the second electrode layer is equal at the first and second ends when the secondary battery is bent.

15. The flexible secondary battery of claim 12, wherein the fixing member comprises a first fixing member and a second fixing member that are separate from each other.

16. The flexible secondary battery of claim 12, wherein the electrode assembly further comprises a first connection tab electrically connected to the first non-coating portion and a second connection tab electrically connected to the second non-coating portion, and
wherein the first and second connection tabs extend perpendicular to the fixing member.

17. The flexible secondary battery of claim 16, wherein a first electrode terminal connected to the first connection tab and a second electrode terminal connected to the second connection tab are exposed outside of the pouch.

18. The flexible secondary battery of claim 12, wherein a fixing member adheres the first electrode layer, the separator and the second electrode layer together, wherein the fixing member is an adhesive or a tape coated with an adhesive, and the adhesive or the tape is located between the first non-coating portion and the separator and between the separator and the second non-coating portion.

19. The flexible secondary battery of claim 12, wherein holes are formed in the first non-coating portion, the separator, and the second non-coating portion, respectively, and the fixing member is a rivet accommodated in the holes.

20. The flexible secondary battery of claim 12, further comprising a protection layer formed on an outer surface of the electrode stack assembly,
wherein the protection layer has a greater bending stiffness than an average bending stiffness of the first electrode layer, the separator, and the second electrode layer.

* * * * *